Figure 1:
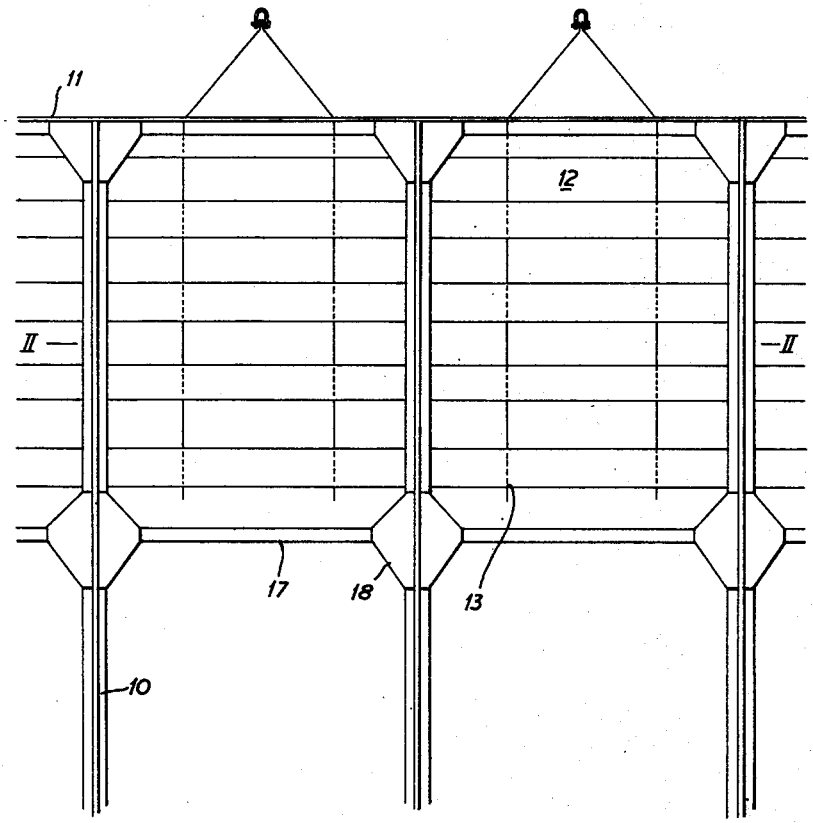

Inventors
Charles Guthrie Guthrie & Ernest Cyril May
By

Inventors
Charles Guthrie Guthrie & Ernest Cyril May
By

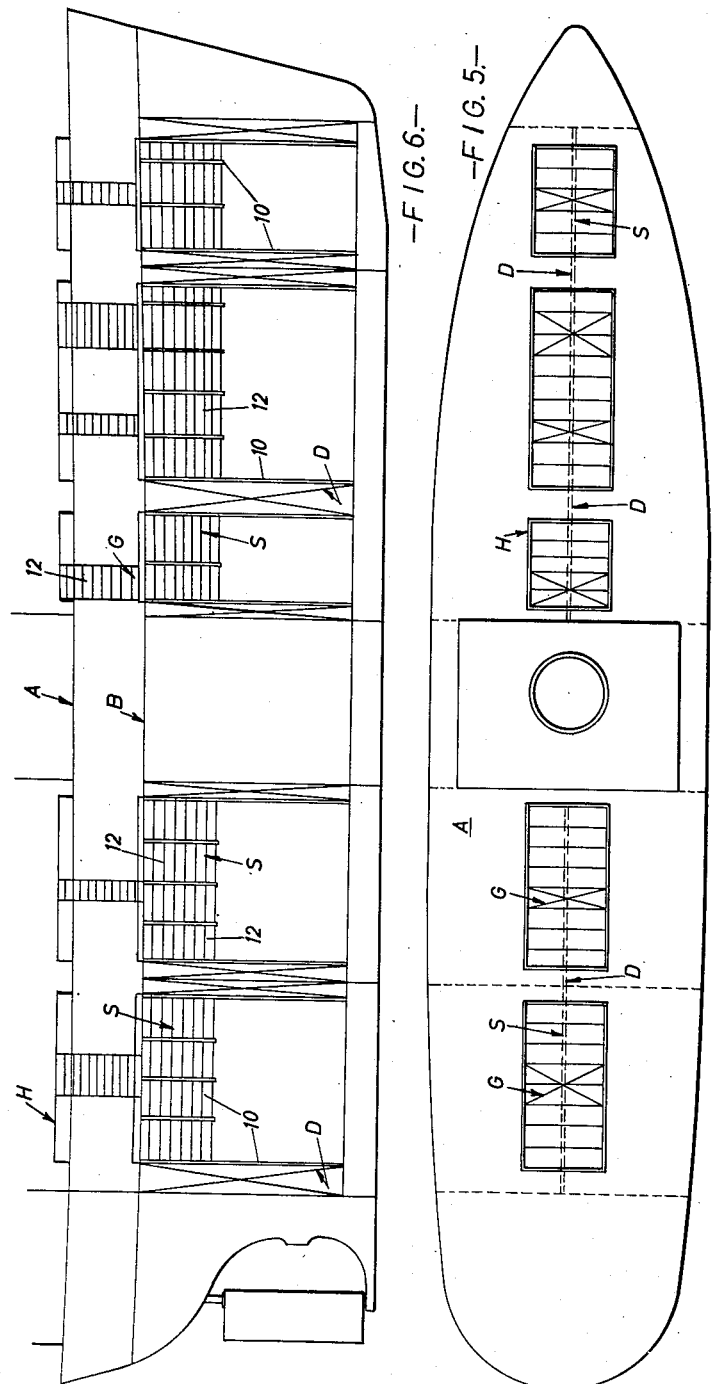

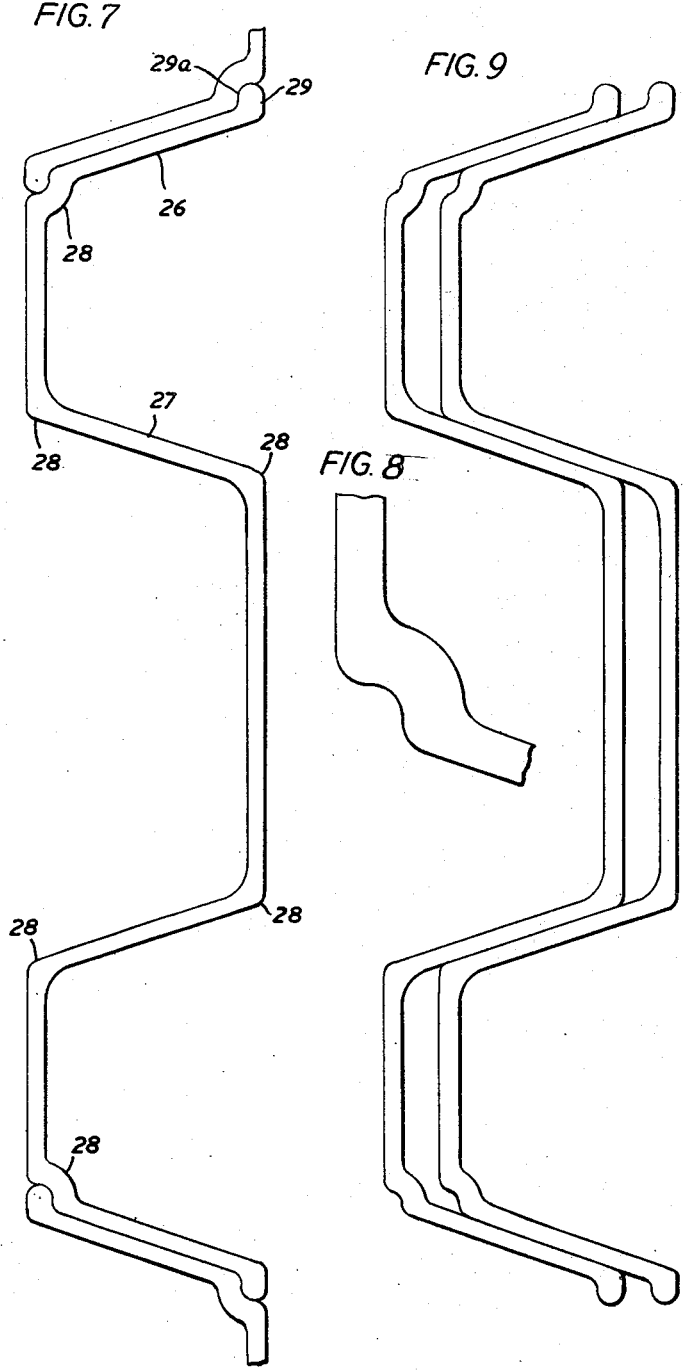

March 5, 1957　　　C. G. GUTHRIE ET AL　　　2,783,729
SHIFTING BOARD, TRUNK FEEDER AND THE LIKE
FOR SHIPS' HOLDS OR HATCHWAYS
Filed Sept. 30, 1953　　　　　　　　　　　6 Sheets-Sheet 6
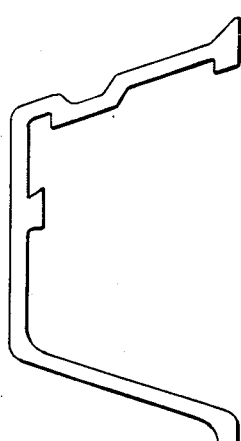
FIG. 10
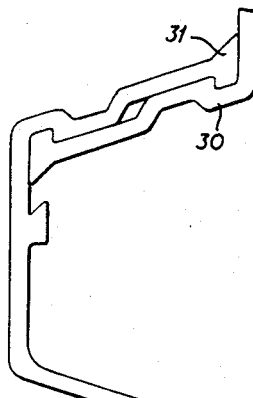
FIG. 11
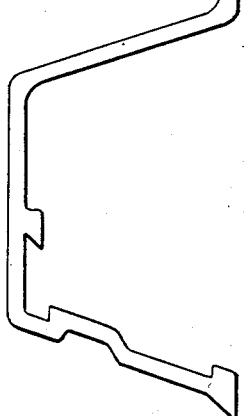
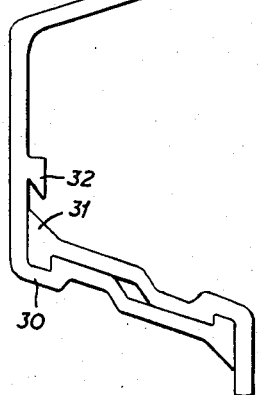
Inventors
Charles Guthrie Guthrie & Ernest Cyril May
By

United States Patent Office 2,783,729
Patented Mar. 5, 1957

2,783,729

SHIFTING BOARD, TRUNK FEEDER AND THE LIKE FOR SHIPS' HOLDS OR HATCHWAYS

Charles Guthrie Guthrie, Lochgoilhead, Scotland, and Ernest Cyril May, Liverpool, England, assignors to M. E. P. Company Limited, Liverpool, England, a British company Application September 30, 1953, Serial No. 383,216

Claims priority, application Great Britain October 3, 1952

5 Claims. (Cl. 114—75)

This invention is concerned with improvements in or relating to retaining walls adapted to serve as shifting boards and trunk feeders for ships' holds.

Certain types of bulk cargoes such as grain are apt, when carried in ships, due to the movement of the ship, to shift about to such an extent that the stability of the vessel would be impaired if no provision was made to limit this movement. In general a centre shifting board running in a fore-and-aft direction along the centre line of the ship is provided, normally, in way of the hatchways, and to meet the permanent centre line bulkhead when the latter is fitted. These shifting boards consist of baulks of timber secured in channels which have usually extended from the tank top of the vessel to the top of the weather deck coaming. Under some present regulations the shifting boards themselves must, for example, extend downwardly from the deck above for a depth of at least one-third of the depth of the hold.

Furthermore as cargoes of this type tend to settle in the lower hold of the ship as a result of the ship's movement it is essential that means be provided for feeding further quantities of the cargo into the lower hold. This is normally achieved by a trunk feeder within the hatchway through to the lower hold in such a manner that as the level of the cargo in the lower hold settles down the grain or other bulk cargo in the trunk feeder can flow into the lower hold to adjust the level. In the past timber has been used for this purpose and has been made graintight by various methods e. g. wrapping the whole of the trunk feeder with burlap and packing suitable material in various gaps and apertures in order to prevent leakage of the grain or other cargo.

It will be appreciated that the cost of timbering a vessel for the provision of shifting boards and trunk feeders in the manner above described is very high. Moreover a considerable proportion of the timber is frequently damaged or destroyed during and after discharge of the cargo. Re-timbering therefore entails a considerable additional expense.

Again, the fitting of the timber shifting boards and trunk feeders occupies considerable time in foreign ports and leads to further loss for the ship owner.

One object of the present invention is to provide a bulk cargo retaining or control wall which dispenses with the use of a large quantity of timber and in which individual panels making up the walls can when not required for use be stacked away or stowed in a relatively small space.

Figure 2:
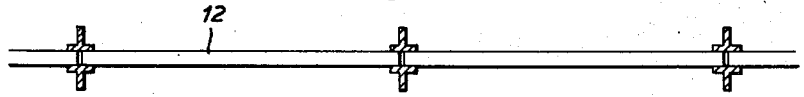
Figure 3:
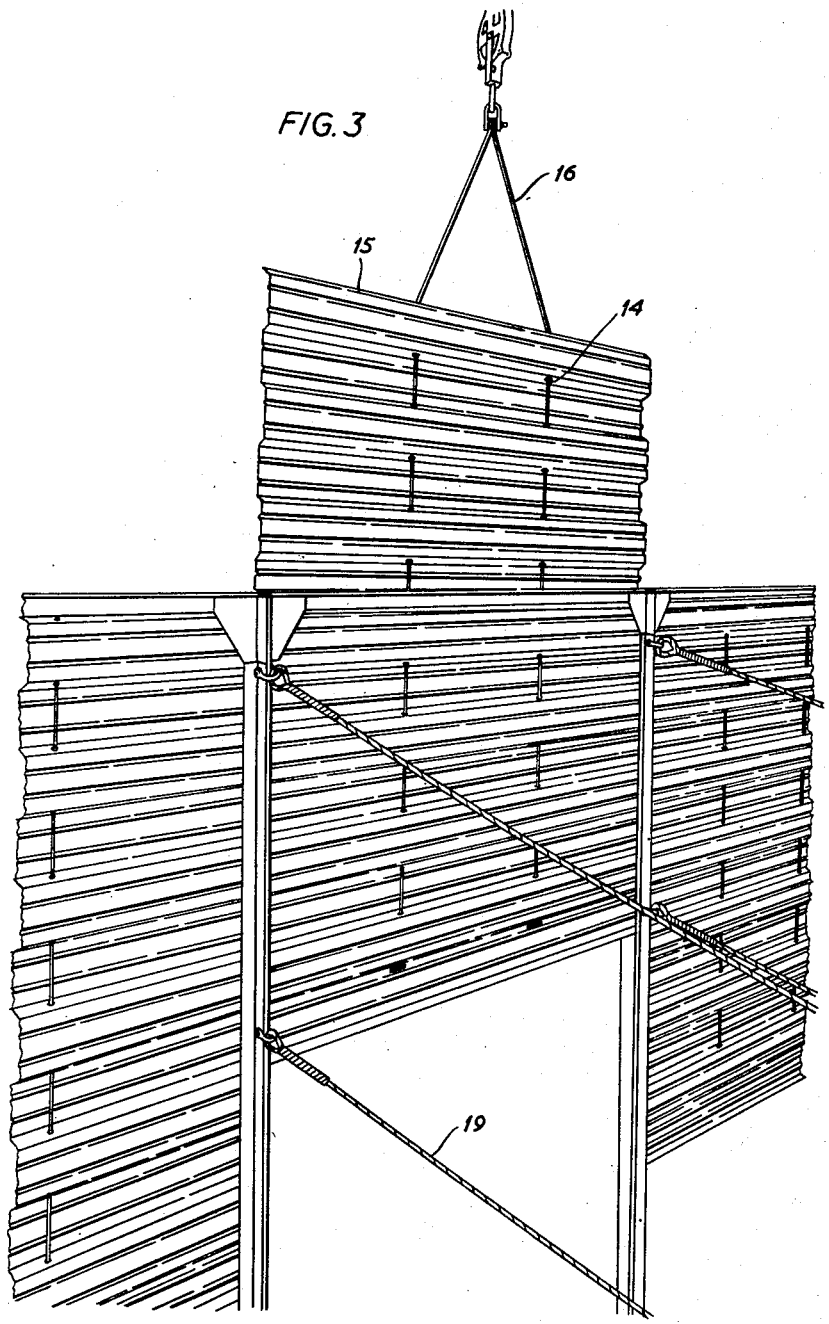
Figure 4:
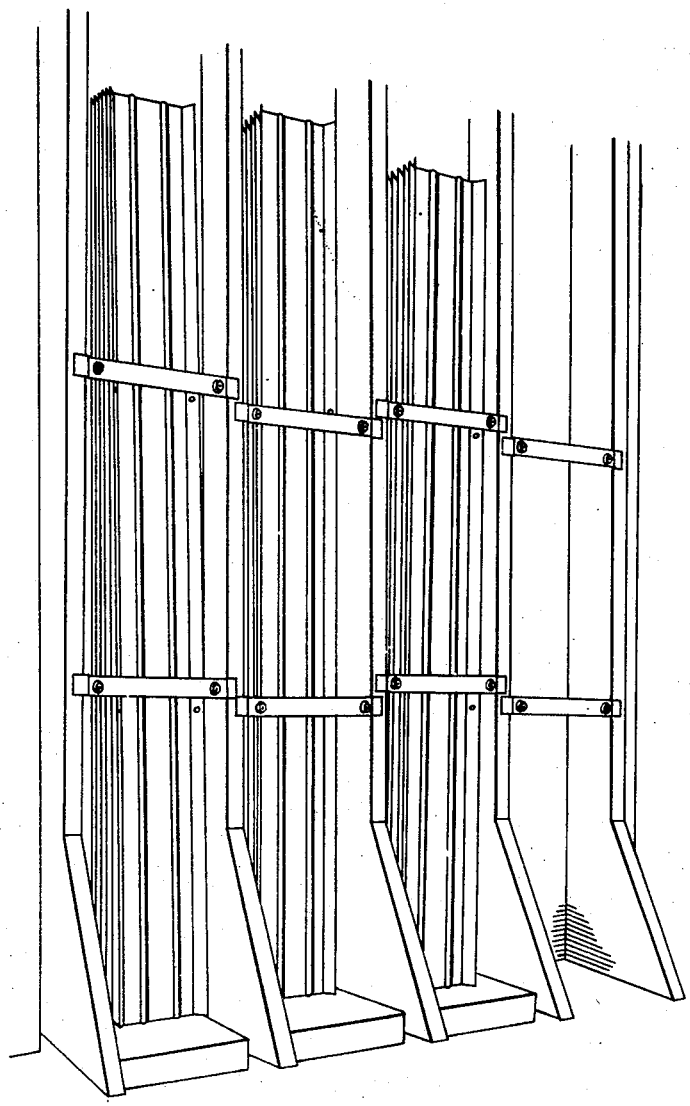

The invention will be further described by way of example with reference to the accompanying drawings wherein:

Figure 1 is a front elevation of a grain shifting board structure as viewed from one side of a ship's hold, Figure 2 is a cross-section on the line II—II of Figure 1, Figure 3 is a perspective view of the structure shown in Figure 1 but with one of the shifting board assemblies partly removed from the hold, Figure 4 is a perspective view showing the manner in which panels forming the shifting board assembly illustrated in Figures 1, 2 and 3 can be stacked compactly into a small space between, for example, stiffeners on a bulkhead, Figure 5 is a diagrammatic plan view of a ship fitted with shifting boards and grain feeders according to the invention, Figure 6 is a diagrammatic elevation of the ship shown in Figure 5, Figure 7 is a sectional view through neighbouring panels of a shifting board or grain feeder division and shows a section for the panels which may be adopted particularly where the panels are made by a process of extrusion, Figure 8 is an enlarged fragmentary view of a part of one of the panels shown in Figure 7, Figure 9 shows how the panels shown in Figure 7 may be nested snugly one within the other when not required for use, Figure 10 shows an alternative section for the panels particularly when made by a process of extrusion and of such a form that means is provided at the edges of the panels whereby they can readily be interlinked together for handling en bloc when required, and Figure 11 shows this interlinking arrangement.

Referring to the drawings and more particularly Figures 1 and 2 the structure illustrated comprises stanchions 10 which are located at spaced intervals in a ship's hold in a fore-and-aft direction and extend downwardly from say the level of the weather deck indicated at 11 to the tank tops. The cross-section of the stanchions is such that they provide oppositely disposed channels adapted slidably to receive the ends of the shifting board assemblies. Each shifting board assembly comprises a plurality of panel members or sections 12 having their longitudinal edges abutting and flexibly linked together by flexible cables 13, which pass through holes 14 in flanges 15 extending along the abutting edges of the panels. The upper parts of the cables 13 form a sling 16 by which the shifting board assembly can be attached to a derrick or the like for lifting it into and out of position in the ship. Conveniently the shifting boards extend into the hold for one-third the full depth thereof. The shifting boards may rest in horizontal channel-members 17 extending between the stanchions 10, the stanchion and channel-member structure being strengthened by means of gusset plates 18. The stanchions 10 are also anchored by tie ropes 19 to the sides of the ship so that the shifting board structure can take the heavy strain imposed on it by say grain cargoes. It should be understood that instead of being articulated together by cables 13 the panels 12 may be otherwise hinged together. Figure 4 shows how the panels can be nested one within the other and stowed against a bulkhead when not required for use.

If the panels are pressed to shape from, for example, sheet steel, then it is preferable to corrugate them or otherwise strengthen them longitudinally as shown in Figure 3.

In applying the invention to grain feeders, four sets of panel sections are interlinked together in a similar manner to the shifting boards already described. The four walls thus obtained are arranged to form the four sides of a box-like structure, the panel sections being supported in stanchions at the corners of the structure. Figures 5 and 6 show several of these box-like structures adapted to serve as grain feeders. These grain feeders are open at top and bottom and of course extend in the usual way from the uppermost deck down into the grain carrying hold so as to feed additional grain as required. In Figures 5 and 6, A indicates the upper deck, B the tween deck, and C the hold which is fitted with the shifting boards S constructed in accordance with the present invention. G indicates the grain feeders just referred to. D indicates the normal permanent centre line divisions. The hatchway coamings are indicated at H.

It will be noted that in the above constructions the panels are placed with the flanges of adjacent panels extending alternately in opposite directions. The effect is given of that of a large corrugated steel sheet of considerable strength but readily dismantleable for compact stowage when required.

Figures 7, 8 and 9 show panel members formed by a process of extrusion e. g. from aluminum alloy. The panel elements for forming the individual panels of a shifting board or trunk feeder wall are all of identical construction and are cut to length from metal extrusions of the section shown in Figures 7, 8 and 9. It will be noted that this section provides side flanges 26 and longitudinally extending strengthening corrugations or ribs 27. The thickness of the metal may be, for example, mainly $\frac{3}{16}''$ but it is preferably thickened to say $\frac{1}{4}''$ at corners as indicated at 28. The edges of the flanges 26 are formed with beads or ribs 29 and when the panels are assembled these ribs lie in channels 29a of adjacent panels. When the panel members are not required for use they can be packed snugly one within the other as shown in Figure 12.

The embodiment of the invention shown in Figures 10 and 11 is similar to that just described with reference to Figure 7 but in this case the flanges of neighbouring panel elements have flexibly interlinking parts 30 and 31, as shown in Figure 11, to provide for lifting of a panel assembly en bloc but so that the panel elements can readily be detached one from another for stowage. There are also parts or stops 32 which, when the panels settle into their operative position, interfit with the parts 31 to provide substantially grain-tight joints between neighbouring panels.

We claim:

1. In a ship the combination of spaced apart stanchions, a plurality of metal panel sections having outwardly inclined longitudinal edge flanges, assembled flanged edge to flanged edge to form a bulk cargo retaining wall and supported by and between said stanchions with said edge flanges of neighbouring panel elements facing in opposite directions, and means flexibly and detachably linking all said panel sections together in said flanged edge to flanged edge relationship whereby they can be lifted en bloc from between the stanchions, said panel sections being fully open between said longitudinal side flanges so that they can be nested one within the other for stowage.

2. In a ship the combination of spaced apart stanchions, a plurality of metal panel elements having formed on them, outwardly inclined longitudinal edge flanges with interlinking parts and assembled flanged edge to flanged edge to form a bulk cargo retaining wall and supported by and between said stanchions with said edge flanges of neighbouring panel elements facing in opposite directions and flexibly and detachably interlinked by said interlinking parts, whereby the several panel sections forming the wall can be lifted en bloc from between the stanchions, said panel sections being fully open between said longitudinal side flanges so that they can be nested one within the other for stowage.

3. In a ship the combination claimed in claim 2 and wherein the panel sections are thickened along their corners for strengthening the sections.

4. In a ship the combination claimed in claim 2 and wherein the panel sections are of multitrough section.

5. In a ship the combination of spaced apart stanchions forming the corners of a rectangle, a plurality of metal panel sections having outwardly inclined longitudinal edge flanges assembled flanged edge to flanged edge to form bulk cargo retaining walls and supported by and between said stanchions, to form a box-like grain feeder, with said edge flanges of neighbouring panel elements facing in opposite directions, and means flexibly and detachably linking all said panel sections together in said flanged edge to flanged edge relationship whereby they can be lifted en bloc from between the stanchions, said panel sections being fully open between said longitudinal side flanges so that they can be nested one within the other for stowage.

References Cited in the file of this patent

UNITED STATES PATENTS

| 848,143 | Wemlinger | Mar. 26, 1907 |
| 1,517,682 | McIntosh | Dec. 2, 1924 |
| 1,590,301 | Lindenlauf | June 29, 1926 |

FOREIGN PATENTS

| 3,173 | Great Britain | Aug. 3, 1880 |
| 145,411 | Australia | Feb. 26, 1952 |
| 461,166 | Great Britain | Feb. 11, 1937 |